United States Patent Office 3,701,758
Patented Oct. 31, 1972

3,701,758
PRESSURE-SENSITIVE ADHESIVES OF
CYANOACRYLATE POLYMERS
Rudolf Maska, Pittsburgh, Pa., assignor to National
Starch and Chemical Corporation, New York, N.Y.
No Drawing. Continuation-in-part of application Ser. No.
657,777, Aug. 2, 1967. This application Aug. 28, 1969,
Ser. No. 853,979
Int. Cl. C08f 15/38, 15/40
U.S. Cl. 260—78.5 R                   8 Claims

ABSTRACT OF THE DISCLOSURE

Acrylic interpolymers which are useful as pressure-sensitive adhesives having improved properties, especially after exposure to elevated temperatures, are obtained by including in the interpolymer a cyano-substituted alkyl ester of an unsaturated carboxylic acid. 2-cyanoethyl acrylate and 2-cyanoethyl methacrylate are the preferred cyano-substituted esters. The interpolymer also includes alkyl acrylates and/or methacrylates, and preferably contains carboxylic acid units. These adhesives have improved tack, adhesion and cohesive strength as compared to corresponding adhesives without the cyano-substituted ester component, the improvement being particularly pronounced after exposure of the adhesive to elevated temperatures.

---

This application is a continuation-in-part of copending application Ser. No. 657,777, filed Aug. 2, 1967, now abandoned.

Pressure-sensitive adhesives are adhesives which are adherent upon application of light pressure, such as can be applied by the finger, and which also can be removed from the surfaces to which they are applied with relative ease. In order to function satisfactorily as a pressure-sensitive adhesive, a material must have a reasonable balance of three properties: tack, adhesion and cohesive strength. Furthermore, the adhesion must develop instantaneously when applied to various types of surfaces, and the adhesive and cohesive strength should be maintained over a period of time and under varying environmental conditions.

Because a pressure-sensitive adhesive is ordinarily required to be cleanly removable from the substrate, the adhesive bond formed by such an adhesive is inherently of low relative strength as compared, for instance, to a thermosetting resin bond. Concomitant with such low strength has been the tendency of pressure-sensitive adhesives in general to have very low strength upon exposure to even moderately elevated temperatures, e.g., 50° C. to 100° C. This deficiency has made such adhesives less desirable when used in many industrial applications and has precluded their use in many other such applications.

Typical pressure-sensitive adhesives are composed of a rubbery elastomer combined with a liquid or solid resin tackifier. While such adhesives are desirable for certain common types of applications, their properties are unsuitable for many demanding large-scale industrial uses. More recently, acrylic resins have been employed as pressure-sensitive adhesives and provide improved properties, particularly in providing stronger bonds. Even these newer adhesives, however, have not proven completely satisfactory; one continuing problem is their tendency to lose strength upon aging and exposure to elevated temperatures.

It has now been found that acrylic pressure-sensitive adhesives having unexpectedly improved properties, including a high degree of strength retention upon exposure to elevated temperatures, are provided by interpolymers formed from monomers which include a cyano-substituted alkyl ester of an ethylenically unsaturated carboxylic acid. Adhesives based upon interpolymers of this type have improved tack, adhesive and cohesive strength; moreover, such adhesives retain their properties upon exposure to elevated temperatures to a much higher extent than do conventional adhesives of this type.

The adhesives herein comprise an interpolymer of monomers consisting essentially of (A) From about 0.5 to about 10 percent by weight of at least one cyano-substituted alkyl ester of ethylenically unsaturated carboxylic acid;

(B) From about 99.5 to about 40 percent by weight of one or more alkyl esters of acrylic or methacrylic acid;

(C) From 0 to about 20 percent by weight of ethylenically unsaturated carboxylic acid; and (D) From 0 to about 40 percent by weight of one or more vinyl esters of saturated carboxylic acid.

The cyano-substituted alkyl ester component of the interpolymers herein is preferably an ester of acrylic acid or methacrylic acid. There can also be utilized corresponding copolymerizable esters of other ethylenically unsaturated carboxylic acids, such as crotonic acid. Cyano-containing mono- and diesters of unsaturated dicarboxylic acids such as maleic acid, fumaric acid and itaconic acid are also useful. 2-cyanoethyl acrylate and 2-cyanoethyl methacrylate are the specific preferred cyano-substituted esters for use in the invention. Other such esters which can be utilized include 2-cyanoethyl crotonate, 2-cyanoethyl hydrogen maleate, bis(2-cyanoethyl)maleate, 2-cyanoethyl hydrogen fumarate, 2-cyanoethyl methyl fumarate, 2-cyanoethyl itaconate, 2-cyanopropyl acrylate, 2-cyanopropyl methacrylate, 3-cyanopropyl acrylate, 3-cyanopropyl methacrylate, 4-cyanobutyl acrylate, 4-cyanobutyl methacrylate, etc. Mixed esters and mixtures of several cyano-substituted esters can also be employed.

While any cyano-substituted alkyl ester which is copolymerizable with the other components can be employed, most esters of the type utilized herein contain an alkyl group of up to about 4 carbon atoms, in which one of the hydrogens is substituted by a cyano (—C≡N) group.

The proportion of cyano-substituted alkyl ester in the interpolymer can be varied, depending upon the particular cyano-substittued ester employed, as well as the other components of the interpolymer and the specific properties desired. However, in most cases, the amount is between about 0.5 percent and about 10 percent by weight of the total interpolymer. The preferred adhesives, such as those containing 2-cyanoethyl acrylate and 2-cyanoethyl methacrylate, ordinarily contain the cyano-substituted ester in an amount between about 1 and about 6 percent by weight.

It may be noted that the cyano-substituted alkyl esters described above differ from the alkyl cyanoacrylates, which are alkyl esters of cyanoacrylic acid. Cyanoacrylates have been utilized in low temperature-curing thermosetting adhesives, and have a basically different structure and provide markedly different properties from polymers containing cyano-substituted alkyl esters as employed herein.

It may also be noted that acrylonitrile and methacrylonitrile are not cyano-substituted alkyl esters and do not provide the type of adhesives desired herein. Thus, while small amounts of such monomers can be included in the interpolymer, they are not used to replace the cyano-substituted ester.

The composition of the remainder of the interpolymer can be varied to some extent. A substantial proportion of the interpolymer is made up of one or more alkyl esters of acrylic acid or methacrylic acid. Such monomers may make up the entire balance of the interpolymer (i.e., up to about 99.5 percent) and constitute at least about 40 percent by weight of the interpolymer.

The particular alkyl acrylates and methacrylates employed depend upon the amount and nature of the other monomers, and can include essentially any polymerizable alkyl acrylate or methacrylate, having, for instance, from 1 to about 20 carbon atoms or more in the alkyl group. Preferred are alkyl acrylates and alkyl methacrylates having from about 4 to about 12 carbon atoms in the alkyl group. Examples of such compounds include butyl acrylate, butyl methacrylate, hexyl acrylate, hexyl methacrylate, 2-ethylhexyl acrylate, decyl acrylate, lauryl methacrylate and similar monomers. Various other alkyl acrylates and methacrylates can also be included, such as methyl acrylate, ethyl acrylate, methyl methacrylate, propyl methacrylate, octadecyl acrylate, etc.

Although not always necessary, it is preferred to include in the interpolymer a small proportion of carboxylic acid units, as provided, for example, by interpolymerized unsaturated carboxylic acid. Acrylic acid and methacrylic acid are among the preferred acids, as are lower alkyl half esters of unsaturated dicarboxylic acids such as maleic acid and fumaric acid, having 1 to 6 carbon atoms in the alkyl group. Methyl hydrogen fumarate, butyl hydrogen fumarate, methyl hydrogen maleate and butyl hydrogen maleate are examples of compounds of this type. Other acids, such as crotonic acid, maleic acid, itaconic acid and fumaric acid, can also be employed. When an interpolymerized acid is included, it is usually present in an amount within the range of from about 0.5 percent to about 20 percent by weight of the total interpolymer.

In some cases it is also desirable to include in the interpolymer one or more copolymerizable vinyl esters of saturated carboxylic acids, such as the vinyl esters of acetic acid, propionic acid, butanoic acid, pentanoic acid, and the like. Vinyl acetate is the specific preferred monomer of this class. Such vniyl esters are used in amounts of up to about 40 percent of the total weight of monomers in the interpolymer.

As indicated above, the interpolymers herein are normally tacky to some extent and the composition of the interpolymer is chosen so as to provide a product of suitable properties. Tack is related to the plasticity of the polymer, which is a measure of the deformability of the polymer under an applied load. The plasticity of the interpolymer (as measured by the standard Williams plasticity number) is generally within the range of from about 1.3 to about 3.5. Where the plasticity is above 3.5, added tackifiers may be necessary.

The adhesive is essentially composed of an interpolymer as described above, or a mixture of polymers which provides an average composition as described. The adhesive is usually contained in an organic solvent, although water-dispersed or emulsified adhesives of this type can also be provided if desired. The solvent can be any solvent in which the interpolymer is soluble or dispersible. Esters such as ethyl acetate, ketones such as methyl ethyl ketone, and alcohols such as isopropyl alcohol, are among the solvents ordinarily employed, but others can be utilized if desired.

There can also be included in the adhesive composition additive materials which do not affect the basic properties of the adhesive. Fillers, tackifiers, antioxidants, stabilizers and the like are thus sometimes added to the formulated adhesive.

The adhesive can be employed in various forms. For instance it can be cast as a free film, interleaved between sheets of release paper, and employed in a transfer operation. More generally, the adhesive is coated onto a backing member and dried to provide pressure-sensitive adhesive coated sheet material, such as tapes, sheets or panels. Cellophane, vinyls, cloth, Mylar, rubber, various laminates, and other such flexible materials, as well as wood, metal, hardboard and other less flexible bearings, can be coated in this manner. In some cases, the adhesive can be used as a dispersion or in solution as a liquid adhesive and applied just prior to use.

There are set forth below several examples which serve to illustrate the invention in several of its embodiments. All parts and percentages in the examples, as well as throughout this specification, are by weight and are based upon non-volatile solids unless otherwise indicated.

EXAMPLE 1

The following monomer mixtures were employed in preparing an adhesive:

|  | Parts by weight | |
| --- | --- | --- |
|  | Mixture A | Mixture B |
| 2-ethylhexyl acrylate | 900 | 900 |
| Methyl hydrogen fumarate | 150 | 150 |
| Vinyl acetate | 105 | 105 |
| 2-cyanoethyl acrylate | 45 | 45 |
| Methyl acrylate | 300 | 300 |
| Ethyl acetate | 1,200 | 600 |
| Benzoyl peroxide | 2 | 2 |

A reaction vessel was charged with Mixture A and heated with a slow nitrogen sparge until the initial exotherm (about 40 minutes, maximum temperature 88° C.). This mixture was held at this temperature for 20 minutes and then Mixture B was added. Heating was continued with refluxing for 1½ hours and then 4 parts of benzoyl peroxide in 180 parts of ethyl acetate were added. Refluxing was continued for 6 more hours; after the first hour, there was added a solution of 10 parts of benzoyl peroxide in 600 parts of ethyl acetate, and each hour thereafter 600 parts of ethyl acetate were added. The product obtained had a total non-volatile solids content of 34.2 percent and a Gardner-Holdt viscosity of Y+.

The adhesive thus produced had outstanding properties, as shown, for example, by comparison with a corresponding adhesive made in a similar manner from the same monomer mixture except that the 2-cyanoethyl acrylate was omitted and replaced with methyl acrylate. The comparative properties of the adhesives were illustrated by several tests carried out as follows:

Adhesion to Steel.—A 2-mil dry film of adhesive was coated on samples of 8-mil thick vinyl sheet (polyvinyl chloride) and aged for 7 days at 150° F. The coated vinyl samples were then applied to steel panels with a hand roller. After one hour, the peel strength was measured at an angle of 180 degrees and a peel rate of 12 inches per minute.

Dead Load Test.—Adhesive coated vinyl samples were prepared and applied to steel panels as in the adhesion test described above; the vinyl-steel assemblies were made with a ½ inch by ½ inch overlap. A one pound weight was suspended from the vinyl with the steel panel maintained at an angle of 30 degrees from the vertical, and the time until separation occurred was measured.

The results of the above tests carried out with the adhesive of Example 1 and the comparative adhesive made without 2-cyanoethyl acrylate (CEA) are shown in Table I.

TABLE I

| Adhesive | Adhesion to steel, lbs. | | Dead load, hrs. | |
| --- | --- | --- | --- | --- |
|  | Initial | 150° F. aging | Initial | 150° F. aging |
| Example 1 | 11.0 | 10 | 28 | 48 |
| Comparative (without CEA) | 8.5 | 8 | 24 | *90 |

*Highest value of three samples (minutes).

As indicated by the above data, the adhesive made with 2-cyanoethyl acrylate had significantly better adhesion and strength.

Another advantage of the adhesives of the invention is their stability at moderately elevated temperatures, such as may be encountered in storage. This was illustrated by a test in which the plasticity number of the adhesive was monitored during aging of the adhesive solution of 150° F. for 7 days. The results of this test carried out on the above adhesives are shown in Table II.

TABLE II

| Adhesive | Williams plasticity No. | |
|---|---|---|
| | Initial | After 7 days at 150° F. |
| Example 1 | 2.67 | 2.67 |
| Comparative (without CEA) | 2.72 | 3.18 |

EXAMPLE 2

Following the general procedure given in Example 1, a series of adhesives were produced with varying amounts of 2-cyanoethyl acrylate; the adhesives and the compositions shown in Table III.

TABLE III

| CEA | Monomer composition (percent by weight) | | | |
|---|---|---|---|---|
| | Vinyl acetate | 2-ethyl-hexyl acrylate | Acrylic acid | |
| 0 | 23 | 71 | 6 | |
| 1 | 23 | 70 | 6 | |
| 2 | 22 | 70 | 6 | |
| 3 | 21 | 70 | 6 | |
| 6 | 20 | 68 | 6 | |
| 10 | 18 | 66 | 6 | |

The adhesives thus obtained were tested for adhesion using the Adhesion test described above, and for tack using the Rolling Ball Tack test promulgated by the Pressure-Sensitive Tape Council, in which a 5.5-gram stainless steel ball is rolled onto a 1 mil thick dry film of the adhesive from a 5-inch long V-shaped channel inclined at a 20-degree angle and brought to the horizontal through a 1 inch section. The distance the ball travels over the film before stopping is a measure of the tack; the shorter the distance, the greater the tack. The results are reported in units of $\frac{1}{16}$ inch and the test is carried out with samples aged for 7 days at 150° F., as in the adhesion test. The adhesives were also evaluated by a Shear Test, in which 8-mil vinyl sheet is coated with a 2-mil dry film of the adhesive and bonded to steel by a 1 inch by 1 inch overlap bond. A 1000-gram weight is suspended from the vinyl at a 180-degree angle, and the temperature of the assembly is slowly increased at a rate of 12.5° F. per minute. The results are reported as the temperature at which the bond fails, permitting the weight to drop.

The results of the above tests with the adhesives containing varying amounts of 2-cyanoethyl acrylate are reported in Table IV.

TABLE IV

| CEA content (percent) | Adhesion test, lbs. | | Tack | | Shear test, ° F. |
|---|---|---|---|---|---|
| | Initial | 150° F. aging | Initial | 150° F. aging | |
| 0 | 6.0 | *2.5 | *90 | *90 | 22 |
| 1 | 6.5 | 5.5 | 30 | 40 | 310 |
| 2 | 10.0 | 6.5 | 22 | 43 | 340 |
| 3 | 7.0 | 5.0 | 24 | 34 | 330 |
| 6 | 6.5 | 3.0 | 70 | *90 | 330 |
| 10 | 5.5 | 2.5 | *90 | *90 | 260 |

*Maximum measurable.

As indicated by the results in Table IV, the adhesives containing 2-cyanoethyl acrylate have marked improvement in properties over that not containing this monomer, with the optimum amount of 2-cyanoethyl acrylate for this particular adhesive polymer being at about 2 percent to 3 percent. In other cases, the optimum concentration of cyano-substituted alkyl ester varies somewhat, with some improvement being noted over a wide range as indicated hereinabove.

Similar results to those described are obtained using other adhesive polymers of the class described. For instance, there can be substituted for the 2-cyanoethyl acrylate in the above illustrated polymers other cyano-substituted alkyl esters of unsaturated acids, such as 2-cyanoethyl methacrylate, 3-cyanopropyl acrylate, 2-cyanoethyl hydrogen fumarate, and the others mentioned above. Similarly, the other components of the adhesive polymer are not critical insofar as the improvement obtained by the inclusion of cyano-substituted ester is concerned, provided that the other components are copolymerizable with the cyano-substituted ester.

According to the provisions of the patent statutes, there are described above the invention and what are now considered to be its best embodiments. However, within the scope of the appended claims, it is to be understood that the invention can be practiced otherwise than as specifically described.

What is claimed is:

1. A pressure-sensitive, normally tacky adhesive composition comprising an interpolymer of monomers consisting essentially of
    (A) from about 0.5 to about 10 percent by weight of at least one cyano-substituted alkyl ester of ethylenically unsaturated carboxylic acid which is copolymerizable with the other components and having up to 4 carbon atoms in the alkyl group;
    (B) from about 99.5 to about 40 percent by weight of one or more alkyl esters of acrylic or methacrylic acid;
    (C) from 0 to about 20 percent by weight of ethylenically unsaturated carboxylic acid selected from the group consisting of acrylic acid, methacrylic acid, crotonic acid, maleic acid, itaconic acid, fumaric acid, and lower alkyl half esters of unsaturated dicarboxylic acids having 1 to 6 carbon atoms in the alkyl group; and
    (D) from 0 to about 40 percent by weight of one or more vinyl esters of saturated carboxylic acid.

2. The adhesive of claim 1 in which said cyano-substituted alkyl ester is 2-cyanoethyl acrylate or 2-cyanoethyl methacrylate.

3. The adhesive of claim 1 in which said alkyl ester contains from about 4 to about 12 carbon atoms in the alkyl group.

4. The adhesive of claim 1 in which said interpolymer includes from about 0.5 percent to about 20 percent, based on the total weight of the interpolymer, of said ethylenically unsaturated carboxylic acid.

5. The adhesive of claim 4 in which said acid is acrylic or methacrylic acid.

6. The adhesive of claim 4 in which said acid is a lower alkyl monoester of maleic acid or fumaric acid.

7. The adhesive of claim 1 in which said vinyl ester is vinyl acetate.

8. Pressure-sensitive adhesive-coated sheet material comprising a backing member having thereon a layer of the adhesive of claim 1.

References Cited

UNITED STATES PATENTS

| 2,379,297 | 6/1945 | Harmon | 260—85.5 |
| 2,824,852 | 2/1958 | Kern | 260—45.5 |
| 3,113,122 | 12/1963 | La Combe | 260—45.5 |
| 3,299,010 | 1/1967 | Samour | 260—78 |
| 3,445,413 | 5/1969 | Jorgensen, Jr. | 260—23 |

JAMES A. SEIDLECK, Primary Examiner

C. A. HENDERSON, JR., Assistant Examiner

U.S. Cl. X.R.

117—122 P; 260—78.5 N, 80.8, 80.81, 85.5 A, 86.1 N